United States Patent [19]
Heal et al.

[11] Patent Number: 6,109,010
[45] Date of Patent: Aug. 29, 2000

[54] MOWING VEHICLE CONTROL SYSTEM

[75] Inventors: Karl D. Heal, Chaska; James Ray Fear, Burnsville; Jerry Zien, Prior Lake, all of Minn.

[73] Assignee: The Toro Company, Bloomington, Minn.

[21] Appl. No.: 09/167,252

[22] Filed: Oct. 6, 1998

[51] Int. Cl.[7] .................................................. A01D 69/00
[52] U.S. Cl. ............................................. 56/10.8; 56/10.5
[58] Field of Search ..................................... 56/10.5, 10.8, 56/10.2 R, 10.2 A–10.23; 318/282

[56] References Cited

U.S. PATENT DOCUMENTS

| | | | |
|---|---|---|---|
| 3,736,729 | 6/1973 | Peterson | 56/10.5 |
| 3,808,914 | 5/1974 | Hauser | 74/850 |
| 3,869,014 | 3/1975 | Federspiel et al. | 180/53 |
| 3,942,604 | 3/1976 | Black, III | 180/103 R |
| 3,969,875 | 7/1976 | Nofel | 56/10.2 |
| 3,984,967 | 10/1976 | Jones | 56/11.8 |
| 3,999,643 | 12/1976 | Jones | 192/52 |
| 4,062,135 | 12/1977 | Dobberpuhl | 37/43 R |
| 4,178,741 | 12/1979 | Lonn et al. | 56/7 |
| 4,181,206 | 1/1980 | Seilenbinder | 192/0.084 |
| 4,195,466 | 4/1980 | Heismann | 56/10.5 |
| 4,236,494 | 12/1980 | Fairchild | 123/630 CC |
| 4,294,327 | 10/1981 | Howard | 180/273 |
| 4,433,530 | 2/1984 | Schaefer | 56/11.8 |
| 5,085,043 | 2/1992 | Hess et al. | 56/10.5 |
| 5,190,019 | 3/1993 | Harvey | 123/630 |
| 5,203,440 | 4/1993 | Peterson, Jr. et al. | 192/0.094 |
| 5,314,038 | 5/1994 | Peterson, Jr. | 180/214 |
| 5,335,487 | 8/1994 | Murakawa et al. | 56/10.5 |
| 5,445,575 | 8/1995 | Sundeen | 477/99 |
| 5,497,604 | 3/1996 | Lonn | 56/10.2 H |
| 5,581,985 | 12/1996 | Secosky | 56/10.3 |
| 5,601,512 | 2/1997 | Scag | 477/111 |
| 5,616,964 | 4/1997 | Peterson, Jr. | 307/9.1 |
| 5,645,135 | 7/1997 | Peterson, Jr. | 180/272 |
| 5,790,355 | 8/1998 | Ishmael | 361/27 |
| 5,934,051 | 8/1999 | Hahn | 56/10.2 R |
| 5,994,857 | 11/1999 | Peterson, Jr. | 318/282 |
| 6,026,634 | 2/2000 | Peter et al. | 56/10.8 |

*Primary Examiner*—Thomas B. Will
*Assistant Examiner*—Arpad Fabian Kovacs
*Attorney, Agent, or Firm*—Larkin, Hoffman, Daly & Lindgren, Ltd.; John F. Klos, Esq.

[57] ABSTRACT

A control system for a riding turf mower. The control system incorporates an interlock system capable of controlling the cutting operation of the mower when traveling in a reverse direction. In a preferred embodiment the present invention includes a riding lawn mower having a prime mover, a transmission for transmitting power from the prime mover to a driving wheel to propel the mower in forward and rearward modes, a cutting deck with a rotating cutting blade wherein the cutting blade has a first condition where the blade rotates and a second condition where the blade is stopped, and an interlock system having an override switch wherein the cutting blade will not rotate when the mower is rearwardly propelled unless the override switch is activated subsequent to a first change in conditions from the first condition to the second condition and wherein a second change in conditions from the first condition to the second condition deactivates the override switch preventing rotation of the cutting blade when the mower is rearwardly propelled until the override switch is again activated.

35 Claims, 6 Drawing Sheets

MOWING VEHICLE CONTROL SYSTEM

THE FIELD OF THE INVENTION

The present invention relates generally to turf mowers having a cutting unit for cutting vegetation, and more particularly to a turf mower control system for disabling the cutting unit of the turf mower if the mower is placed in a reverse direction condition, and still more particularly to an override switch system for establishing an override condition for preventing the disablement of the cutting units if the mower is placed in a reverse direction condition.

BACKGROUND OF THE INVENTION

Turf mowers are well known machines used for cutting grass and other vegetation. Such a machine may include a tractor vehicle and a tractor-mounted cutting unit which can driven by the engine of the tractor through a drive train. The drive wheels of the tractor are driven by the tractor engine by way of a transmission which includes a manually operated control.

While various interlock mechanisms and control systems for turf mowers are known, the combined features of and benefits derived from the present invention are not illustrated or taught by those prior inventions. For example, interlock mechanisms are known which prevent operation of the cutting unit during reverse travel of the tractor. Interlock approaches may include mechanical systems, such as disclosed in U.S. Pat. No. 3,984,967, or electro-mechanical systems, such as disclosed in U.S. Pat. Nos. 5,601,512 and 5,314,038. Similarly, other inventions disclose override control systems which allow selective operation of mowing machines under certain circumstances. Such override control systems include "supervisor-switched" systems which may include a switch with a removable key to limit the override decision-making to one or more individual, who may not be the machine operator. A supervisor-switched control system for turf mowers is disclosed in U.S. Pat. No. 5,497,604 to Lonn, and assigned to The Toro Company, assignee herein.

SUMMARY OF THE INVENTION

The present invention is a control system for a mowing vehicle for disablement of an associated cutting unit under certain operating conditions, namely, operating the vehicle in reverse. Power transfer to the cutting unit may be through an electric PTO (power-take-off) clutch or a direct mechanical coupling (gears, belts, etc.) between the engine and the cutting unit. Disablement of the cutting unit may be accomplished either by deactivating an electric PTO clutch or by deactivating the engine of the vehicle. The present invention further includes an override feature which restricts the reverse-direction disablement of the cutting unit. The override system may be responsive to the PTO switch of the vehicle so that the override feature is available only after the PTO has been activated and remains available only until the PTO is deactivated.

It is an object of the present invention to provide an improved interlock and override control system for a mowing vehicle. It is another object to provide such a circuit for a vehicle with a PTO or similar drive. It is still another object to provide selective PTO operation in reverse under limited conditions. These and other objects, features and advantages of the present invention will become apparent to one skilled in the art upon analysis of the following detailed description in view of the drawings.

BRIEF DESCRIPTION OF THE DRAWINGS

The present invention will be described hereafter in the Detailed Description of Preferred Embodiments, taken in conjunction with the following drawings, in which like reference numerals refer to like elements throughout.

DETAILED DESCRIPTION OF PREFERRED EMBODIMENTS

Figure 1:
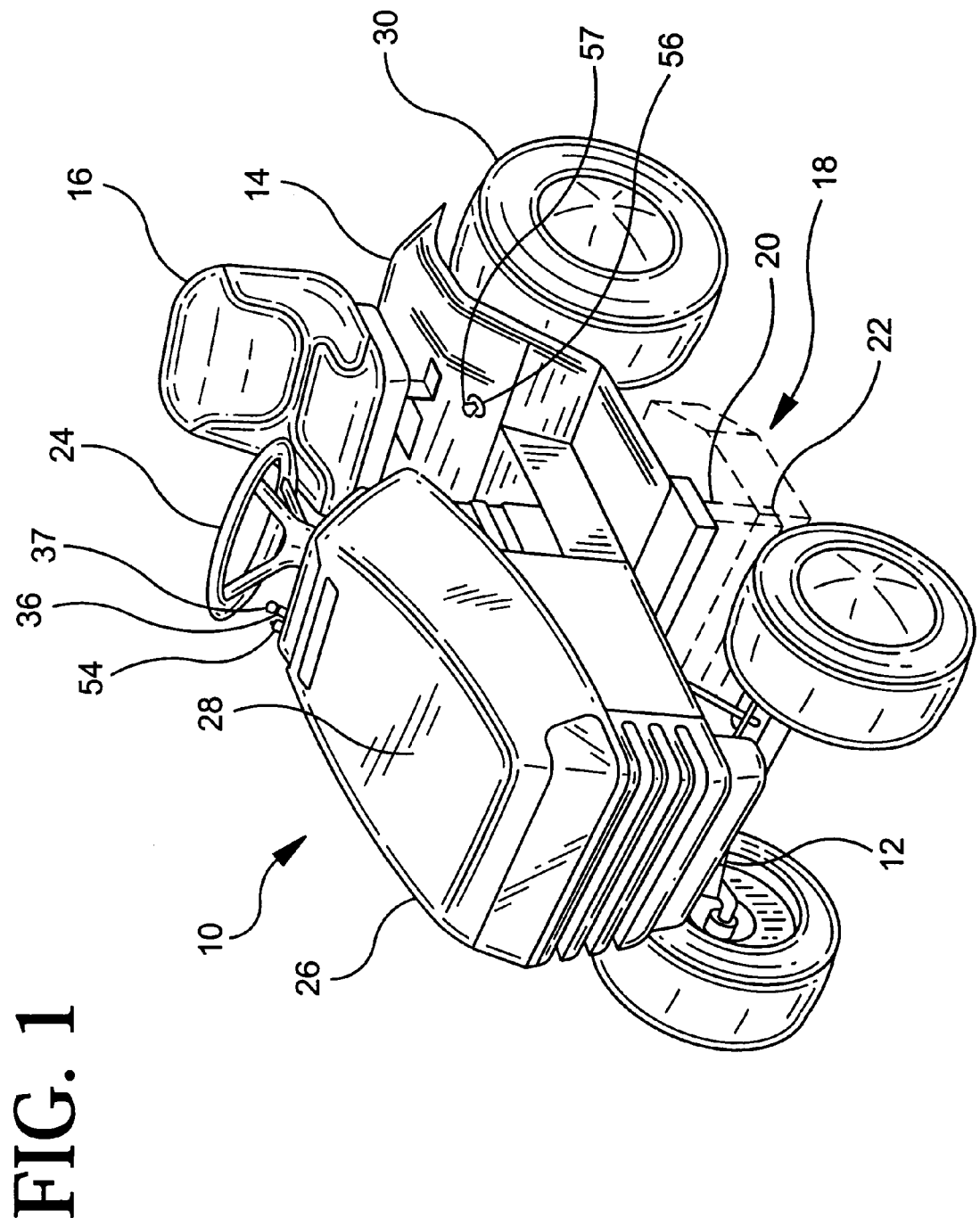
FIG. 1 is a perspective view of an improved lawn mower, of the type upon which the present invention may be implemented.

Referring first to FIG. 1, a lawn mowing vehicle 10 is shown in perspective view. Lawn mower generally includes a frame assembly 12 having a body assembly 14 and an operator seat 16. A powered implement is carried by the lawn mower 10 and may include a cutting unit 18 having a cutting deck 20 enclosing one or more rotatable cutting blades 22. Tractive and directional operation of the vehicle 10 is controlled by the operator by hand controls, foot controls, and a steering wheel 24. The body assembly 14 includes a front housing 26 enclosing an engine 28 which provides power for tractive and cutting unit 18 operation. The engine 28, defined herein to include a prime mover of fuel or electric operation, may be a gas powered engine activated through an ignition switch 36 having a removable key 37. Encouplement of the engine 28 to drive wheels 30 and to the cutting unit 18 may be accomplished in a variety of manners as appreciated by those skilled in the art, and may include a transmission, belts, pulleys, gears, power-take-off (PTO) systems, etc. The power transfer for the cutting unit 18 operation may be selectively activated by the operator through a PTO switch 54, for example. PTO switch 54 may be a PTO status switch indicating power to the cutting unit 18 or a switch for an electric PTO clutch. An override condition (as explained more fully hereinafter) may be selectively activated by a switch 34 with a removable key to permit cutting operations while traveling in reverse. Although illustrated and described herein as it applies to a particular lawn mowing vehicle, the present invention may find applicability to a variety of lawn mowing vehicles with variants between the vehicles including, engine type and position relative to the vehicle, transmission type and position, cutting unit 18 type and position, etc.

Figure 2:
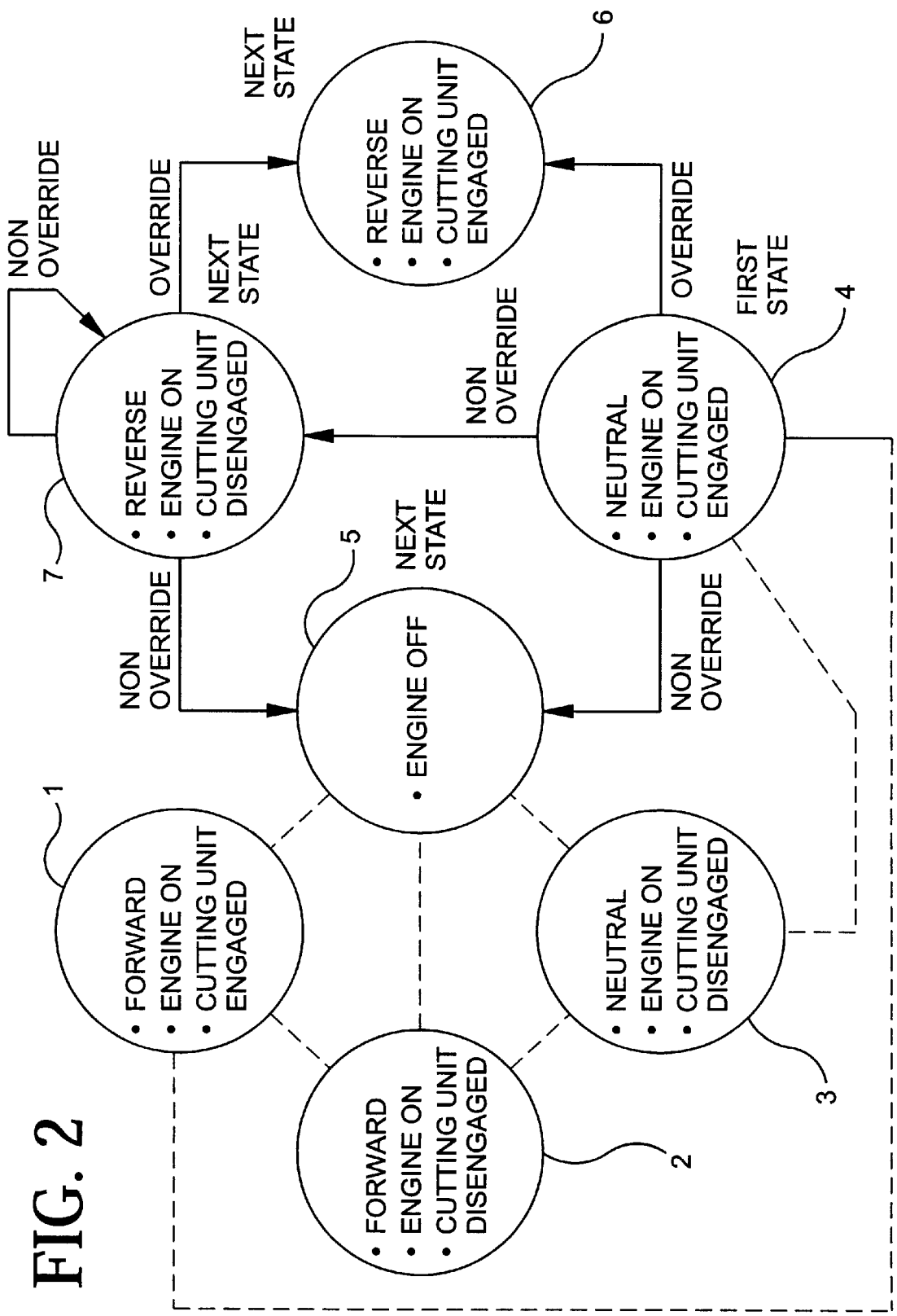
FIG. 2 is a diagram of the operational states of the lawn mower of FIG. 1.

Operating conditions of the vehicle 10 include forward motion, neutral, reverse motion and cutting unit 18 activation and deactivation. Referring now to FIG. 2, a state diagram illustrates the operational states of the mowing vehicle 10 according to the present invention (the relevance of such a state diagram readily appreciated by one skilled in the art of software design to facilitate the implementation of the control system 40 in software). Each mutually exclusive state includes a combination of vehicle 10 conditions of the engine 28, the cutting unit 18, and the traveling direction. Condition states for the engine 28 are an engine operating condition and an engine non-operating condition. Condition states for the cutting unit 18 are a cutting unit activated or first condition and a cutting unit deactivated or second condition. Similarly, condition states for the mower 10 direction of movement are forward, neutral and reverse condition. As an example, the mowing vehicle 10 is said to be in operational state 1 (arbitrarily chosen) when the engine 28 is operating, the vehicle 10 is in forward motion (as controlled by the gear selector, etc.), and the cutting unit 18 is engaged. Similarly, the mowing vehicle 10 is in operational state 2 when the engine 28 is operating, the vehicle 10 is in forward motion, and the cutting unit 18 is disengaged. State 3 requires that the vehicle 10 be in neutral, with the engine 28 operating and the cutting unit 18 disengaged. States 4–7 are of particular relevance to the control system 40 of the present invention and are described more fully hereinafter. Movement between states occurs when one of the underlying conditions changes. For simplicity sake, and only for exemplary purposes, condition changes occur separately in time (meaning the operator changes direction or activates the cutting unit 18 at distinct times, and not at the same time).

State 4 requires that the engine 28 be operating, the cutting unit 18 be engaged, and the direction condition be neutral. The mowing vehicle 10 may be in state 4 just prior to reversing direction of the vehicle. To assist in understanding the control system 40 of the present invention, state 4 may be referred to as the "first-state," while states 5, 6, 7 are referred to as "next-states." State 5 is the engine 28 non-operating state, state 6 is the engine 28 operating, cutting unit 18 engaged, and reverse direction state, and state 7 is the engine 28 activated, cutting unit 18 disengaged, and reverse direction state. When the vehicle 10 is in state 4 and under a non-override condition (as controlled by the override system as described hereinafter) and the operator shifts from neutral to reverse direction, the control system 40 dictates that the next state will be either the engine 28 non-operating state 5, or the cutting unit 18 disengaged state 7, both states 5 and 7 preventing further operation of the cutting unit 18 while in the reverse direction. On the other hand, with the vehicle 10 in state 4 and under an override condition, the next state upon the operator shifting from neutral to reverse will be the cutting unit 18 engaged state 6 which permits the cutting unit 18 to remain engaged so that the vehicle 10 may mow in reverse.

Similarly, state 7 may be referred to as another "first-state" with states 4, 5, 6 as next states. The vehicle 10 is in state 7 when traveling in reverse travel with the cutting unit 18 disengaged. When the vehicle 10 is in state 7 and the operator then engages the cutting unit 18 under a non-override condition, the next state will either be state 5 or state 7 (neither state engaging the cutting unit 18 to mow). On the other hand, under an override condition with the vehicle 10 in state 7, the next state upon the operator activating the cutting unit 18 will be state 6 which permits the operation of the cutting unit 18 while traveling in reverse.

Figure 3:
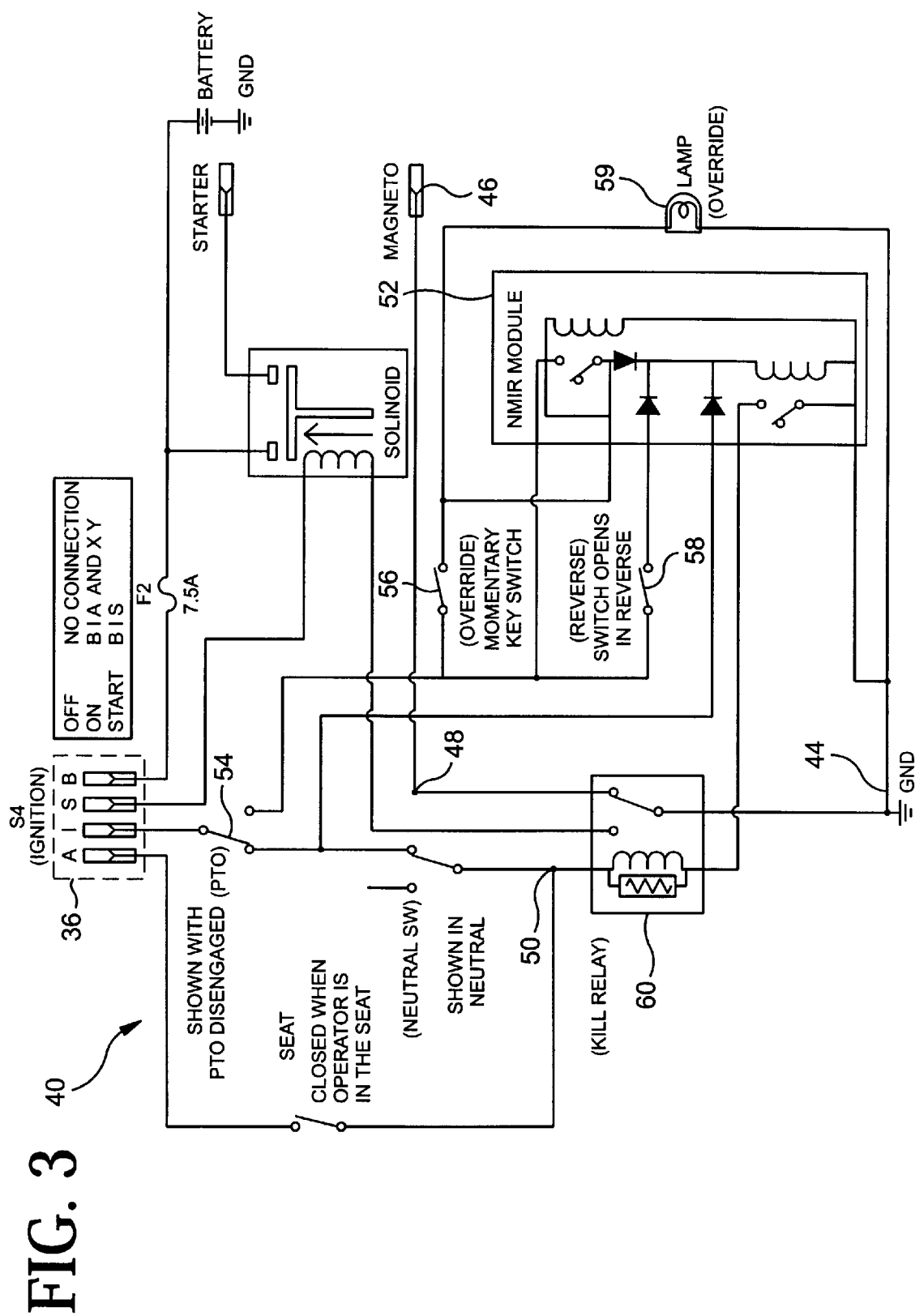
FIG. 3 is a schematic diagram of a first embodiment of a control system of the present invention.
Figure 4:
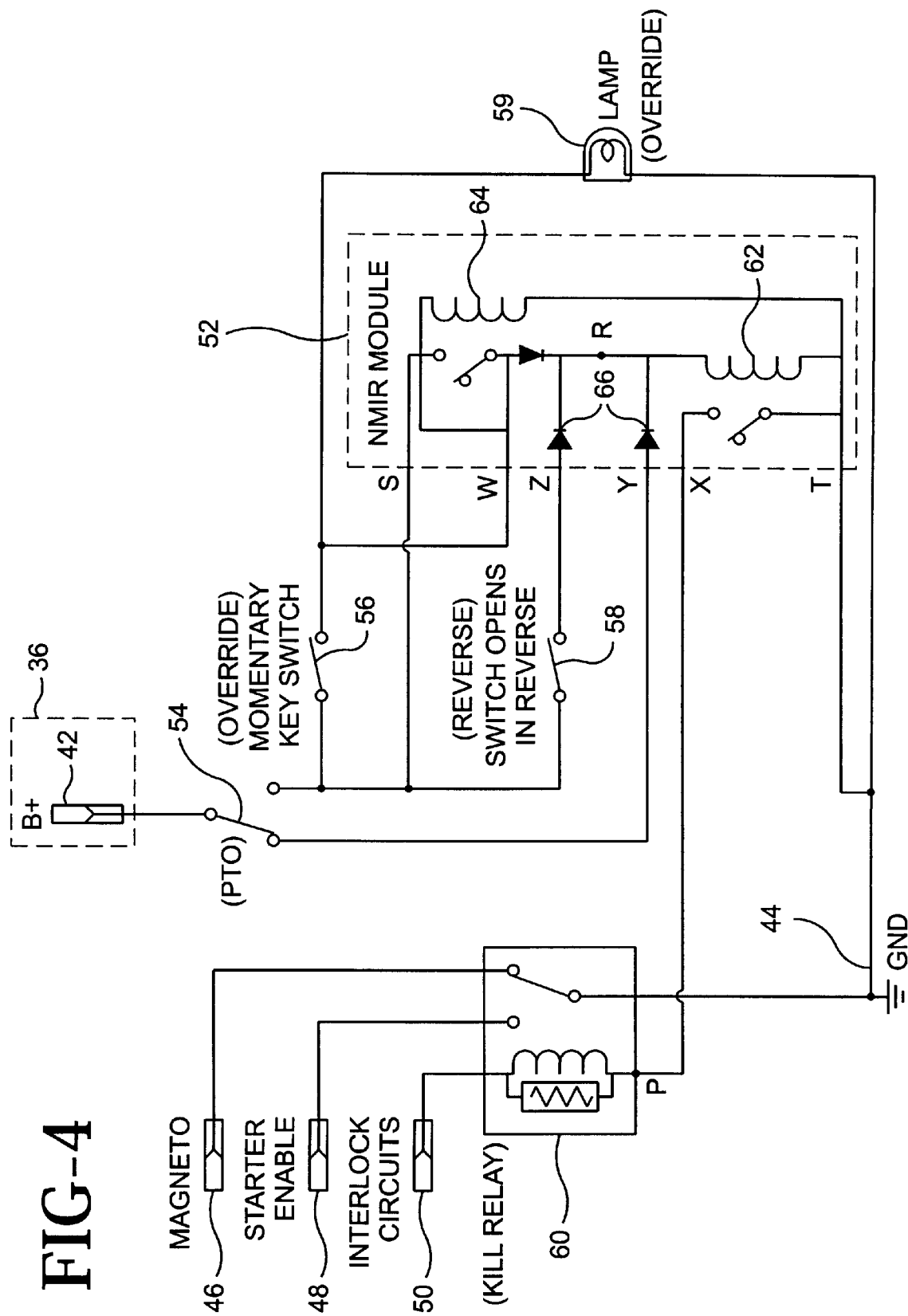
FIG. 4 is an enlarged portion of the schematic diagram of FIG. 3.

Referring now to FIGS. 3 and 4, a first embodiment of the control system 40 of the present invention is detailed in schematic view. Control system 40 includes a power terminal (B+) 42, a ground terminal 44, a magneto terminal 46, a starter enable terminal 48, and an interlock circuits terminal 50. Control system 40 further includes a control module 52, a PTO status switch 54, an override switch 56, and a reverse switch 58.

This first embodiment of the control system 40 of FIGS. 3 and 4 is an "engine-kill" version, and as one skilled in the art will appreciate, the magneto terminal 46 can be coupled to ground 44 to deactivate an operating engine 28. The magneto terminal 46 is selectively coupled to ground 44 through a kill relay switch 60 to deactivate the engine 28; an energized kill relay 60 permits engine 28 operation, while a de-energized kill relay 60 couples the magneto terminal 46 to ground 44 (as shown) to deactivate the engine 28. As an aside, it is appreciated that the magneto terminal 46 for a different ignition control system (not shown) may be energized to run rather than grounded to kill as described herein. The kill relay 60 is energized in response to the interlock circuit terminal 50 and a control module voltage 52 condition at terminal X. More particularly, the kill relay 60 is energized when a current path exists from the interlock circuit terminal 50 through the kill relay 60 and through a control module 52 first relay switch 62 to ground 44. Interlock circuit terminal 50 is responsive to additional features of the vehicle 10, such as an operator seat switch, a neutral switch, PTO status switch 54, seat belt switch, etc., and is at an operational voltage upon satisfaction of external conditions such as the operator being seated, the vehicle 10 is in neutral, PTO disengaged, etc. The starter enable terminal 48, through an activated kill relay 60, provides a ground path to the starter circuit (not shown) of the vehicle 10 to activate the engine 28. PTO switch status 54 includes an on position and an off position, corresponding to engaging and disengaging the cutting unit 18 of the vehicle 10 through known mechanisms (not shown). FIGS. 3 and 4 illustrates the PTO status switch 54 in its off position. Reverse switch 58 selectively creates a current path between the PTO status switch 54 (in the off position) and ground 44 in response to the operator placing the vehicle 10 in forward and neutral. Reverse switch 58 is opened in response to the operator placing the vehicle 10 in reverse. Override switch 56, which may be a momentary contact switch having an override state, selectively creates a current path between the PTO status switch 54 (in the on position) and ground 44 in response to the operator actuating the override switch 56. Override switch 56 may be a switch with a removable key 57 to establish the current path. In this manner, override switch 56 may be referred to as a "supervisor switch," since the key 57 may be removed to prevent vehicle 10 operation in the override condition. The key 57 may be the same cut as the ignition key 37, but must be separate as the ignition key 37 cannot be removed during engine 28 operation. An override lamp 59, connected between the override switch 56 and ground 44, is activated to indicate an override condition when the PTO status switch 54 is in the ON position and the override switch 56 has been contacted.

Referring to FIG. 4, the control system 40 includes the control module 52 which is operatively coupled to the PTO status switch 54, the override switch 56, the reverse switch 58, and the kill relay 60. Control module 52 includes a first relay switch 62 and a second relay switch 64 each which having a terminal 'T' to ground 44 and each relay switch 62, 64 being energized upon a higher voltage being present at respective coil terminals X and W. For the first relay switch 62, a higher voltage (with respect to ground) at terminal R activates the relay 62 to create a current path for the kill relay 60 circuit, while for the second relay switch 64, a higher voltage at terminal W activates the second relay 64. Second relay switch 64 may operate as a latching relay, as once the second relay 64 is activated by terminal W being high, current may flow through terminal S and circulate to maintain the second relay 64 in an activated state. Control module 52 further includes diodes 66 to limit current flow direction.

The operation of the control system 40 of FIGS. 3 and 4 will now be described. To start the mowing vehicle 10, kill relay 60 must be activated to create a current path between the starter enable terminal 48 and ground 44. Kill relay 60 is activated upon interlock terminal 50 being at a higher voltage than ground 44 and the first relay switch 62 of the control module 52 being activated to create a current path between the kill relay terminal P and ground 44. Interlock terminal 50 is at a higher voltage when the interlock features of the machine are satisfied. The interlock features may include operator presence in the seat, machine in neutral, PTO disengaged, etc. First relay switch 62 of the control module is activated when the PTO status switch 54 is in the off position. Engine 28 may be started by an electric starter controlled by the ignition switch 36.

Once the engine 28 has been started, engine 28 operation will continue so long as the kill relay 60 remains activated. Again, kill relay 60 remains activated so long as interlock terminal 50 is at a higher voltage than ground 44 and the first relay switch 62 of the control module 52 is activated to create a current path between the kill relay 60 terminal P and ground 44. First relay switch 62 of the control module 52 is activated if any one of the following conditions are met: the PTO status switch 54 is in the OFF position (no mow), or the PTO status switch 54 is in the ON position and either the reverse switch 58 remains closed (vehicle 10 is in neutral or forward gear) or the override switch 56 has been actuated after the PTO switch 54 is placed in the ON position.

Cutting operations may commence after the user selectively actuates the PTO status switch 54 to engage the cutting unit 18. At this point, two modes of vehicle 10 operation may then be entered. The first, a non-override mode, permits the cutting unit 18 to remain engaged so long as the vehicle 10 remains in a forward gear (state 1) or in neutral (state 4). If the vehicle 10 is under the non-override mode of operation and is then placed in reverse, the engine 28 and cutting unit 18 will be deactivated by operation of the control system 40 (state 5). Additionally a second mode, an override mode of operation, permits the cutting unit 18 to remain engaged even after the vehicle 10 is placed in a reverse direction condition (state 6). The override mode of operation thus permits mowing while the machine 10 is traveling in reverse. The override mode may be entered by actuating the override switch 56 through its removable key 57. (In this preferred embodiment, the override mode may be entered only after the PTO has been engaged, though alternative implementations may provide entry in to the override mode by activating the override switch 56 and then activating the PTO switch 54.) This causes the second relay switch 64 of the control module 52 to latch in an active state providing a current path between terminal S and ground 44. At this point, since the current path exists between terminal B+, S, R, and ground 44, the first relay switch 62 remains activated independent of the status of the reverse switch 58. Thus, both the first relay switch 62 and second relay switch 64 remain activated by the "self-feeding" or latching nature of the second relay switch 64. It is readily appreciated that the current path is dependent on the PTO switch 54 being in the ON position and as a result, once the PTO switch 54 is returned to the OFF position, the override condition is removed (the control system 40 is 'reset' to the non-override condition where, as described above, the next time the cutting unit 18 is engaged, the control system 40 will deactivate the engine 28 upon the vehicle 10 being placed in reverse).

Figure 5:
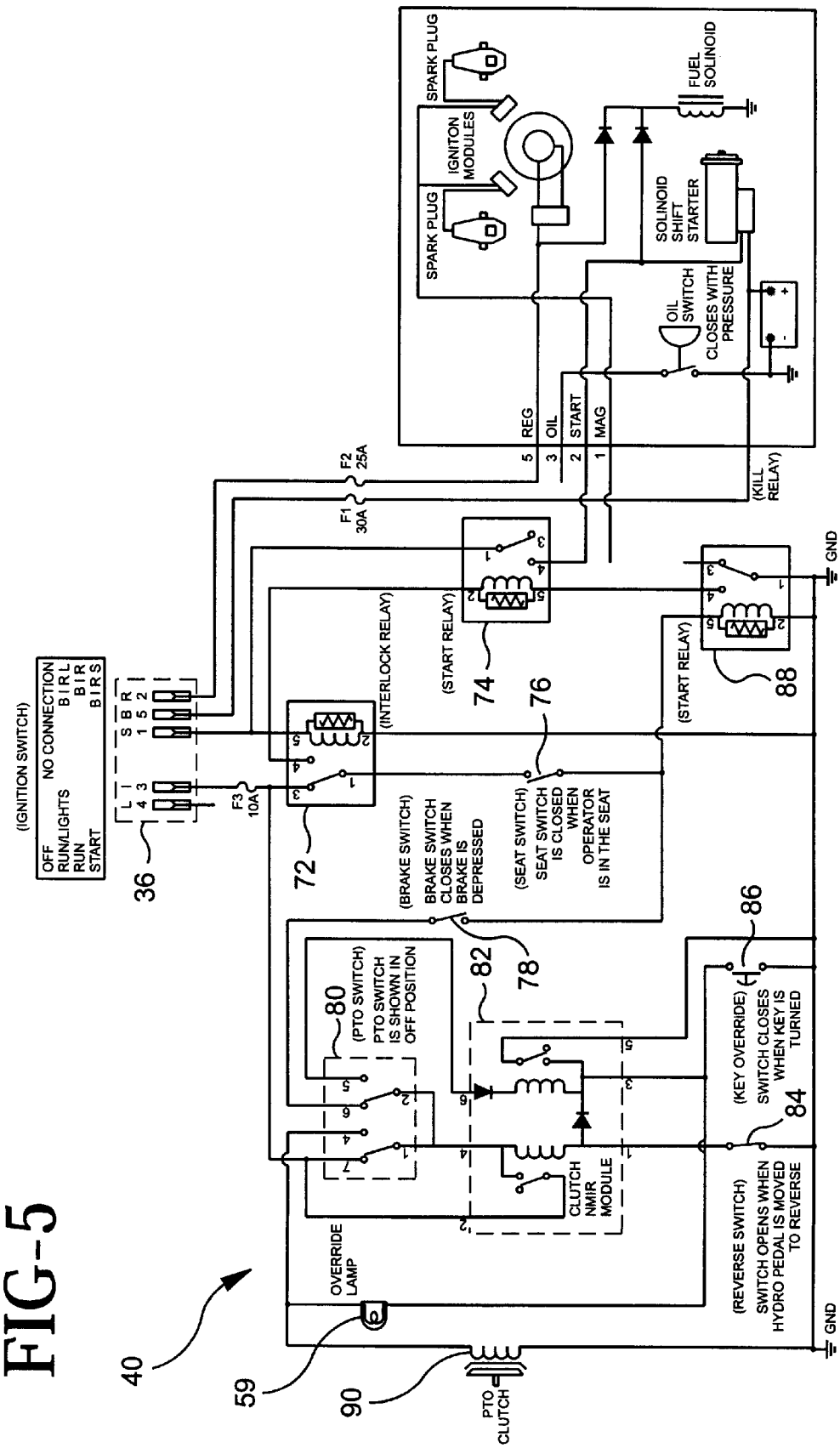
FIG. 5 is a schematic diagram of a second embodiment of a control system of the present invention.
Figure 6:
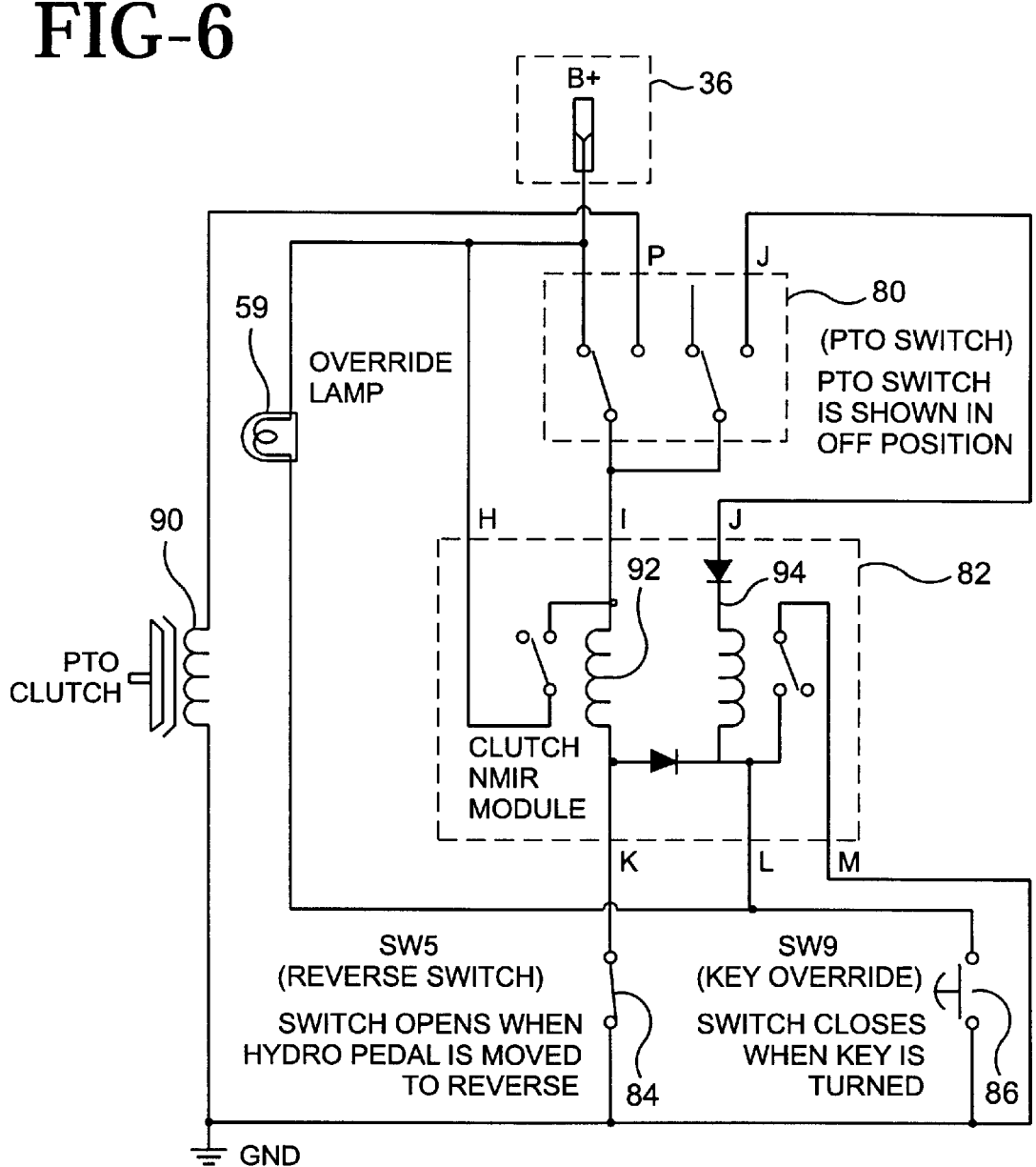
FIG. 6 is an enlarged portion of the schematic diagram of FIG. 5.

Now referring to FIGS. 5 and 6, a second embodiment of a control system 40 according to the present invention is illustrated as a schematic of an electrical system for a mowing machine 10. The electrical system includes an ignition switch 36, an interlock relay 72, a start relay 74, a seat switch 76, a brake switch 78, a PTO switch 80, a control module 82, a reverse switch 84, an override switch 86, a kill relay 88, and a PTO clutch 90. PTO switch 80 is user actuatable and includes a PTO ON and PTO OFF position. PTO switch 80 is shown in the OFF position in FIGS. 5 and 6. The PTO clutch 90 operatively couples the engine 28 to the cutting unit 18 when terminal P is at a higher voltage relative to ground. In this embodiment, rather than disengage the cutting unit 18 by deactivating the engine 28 of the mowing vehicle 10 as in the embodiment of FIGS. 3 and 4, the cutting unit 18 is deactivated by operation of the electric PTO clutch 90.

Referring more particularly to FIG. 6 which depicts an enlarged portion of the system of FIG. 5, the control system 40 and control module 82 and associated switching may be described. PTO switch 80 includes terminals H, I, P, and J. When the PTO switch 80 is in the OFF position (as illustrated in FIG. 6) the terminals I and H are electrically coupled and when PTO switch 80 is in the ON position, the terminals I, P, and J are coupled. Control module 82 includes terminal H coupled to vehicle 10 system high voltage B+, terminals I and J coupled to the PTO switch 80, terminal K coupled to the reverse switch 84, terminal L coupled to the override switch 86, and terminal M coupled to ground. Control module 82 includes a first relay switch 92 for establishing a current path between terminals H and I in response to relative voltages present at terminals I and K. Control module 82 includes a second relay switch 94 for establishing a current path between terminals L and M in response to relative voltages present at the terminals J and L. An override indicator light 59 is activated when in override mode.

Still referring to FIG. 6, the operation of a mowing vehicle 10 may now be described. The engine 28 can be started upon satisfaction of conditions such as required in the embodiment of FIGS. 3 and 4, for example: PTO switch 80 in the OFF position, vehicle 10 in neutral, operator seated, etc. Engine 28 may be started by an electric starter (not shown) which is activated by a ignition switch 36 with a removable key 37. Once the ignition switch 36 has been turned on, the first relay switch 92 of the control module 82 is immediately activated to provide a current path between terminals H and I. The PTO switch 80 for engaging the cutting unit 18 may then be activated. The current path (from terminal H to terminal I) forms a portion of the current loop for the PTO clutch 90 when the PTO switch 80 is moved into the ON position. The PTO clutch 90 is activated when current flows through path B+-H-I-P- Ground. The PTO clutch 90 is deactivated upon any break in this current path. The control module 82 breaks the current path by removing terminal K of the first relay switch 92 from system ground when the reverse switch 84 is opened in a non-override condition. In other words, terminal K remains at ground potential (PTO clutch 90 active) so long as reverse switch 84 remains closed (vehicle 10 not in reverse) or the second relay switch 94 of control module 82 is activated by current flowing along path B+-I-J-L-M- Ground (in override mode).

In this preferred embodiment, the override mode of operation is available only after the PTO switch 80 transitions from its OFF position to its ON position. Alternatively, a system may be implemented which permits override operation upon activating the override switch 86 and then activating the PTO. The override switch 86 momentarily couples terminal L of the control module 82 to ground which results in the second relay switch 94 of the control module 82 being activated to electrically couple terminals L and M of the control module 82. In this manner, during override mode of operation, the terminals K and L are maintained at system ground irrespective of the reverse switch 84 condition thus permitting mowing while traveling reverse. Once the PTO switch 80 is switched back to its OFF position, the override mode is released by the deenegization of the second relay switch 94 of the control module 82. As a result, the vehicle 10 in the non-override mode is prevented from cutting unit 18 engagement during reverse travel, while in the override mode reverse mowing is permitted. Override mode is controlled by the override switch 86 through removable key 57 and override mode is entered only after the PTO switch 80 transitions from OFF to ON and the override switch 86 is then contacted. The override mode is automatically reset by operation of the control module 82 upon the PTO switch 80 returning to its OFF position. Thus, rather than a continuous override mode being available by operation of the override switch 86, a more limited override period is implemented which is responsive to the PTO switch 80 cycle.

It will be appreciated by those skilled in the art that although the present invention has been illustrated with discrete electrical component systems, it may also be implemented with a software-based control system. Further, it is understood that even though numerous characteristics and advantages of the present invention have been disclosed in the foregoing description, the disclosure is illustrative only and changes may be made in detail, especially in the vehicle and powered implement configurations (reels, front-mount mowers, tillers, etc.). Other modifications and alterations are within the knowledge of those skilled in the art and are to be included within the scope of the appended claims.

What is claimed is:

1. A control circuit for a vehicle, said vehicle having an engine capable of being in an operating condition or in an non-operating condition, said vehicle capable of movement and being in a forward direction condition, a reverse direction condition, or a neutral condition, said vehicle including a selectively operable cutting unit having a disengaged condition or an engaged condition for cutting vegetation, a plurality of vehicle operational states being defined by a combination of said engine operating condition and said engine non-operating condition and said forward direction condition and said reverse direction condition and said neutral condition and said disengaged condition and said engaged condition a first vehicle operational state being defined by the engine operating condition and the neutral condition and the cutting unit engaged condition, a second vehicle operational state being defined by the engine non-operating condition, a third vehicle operational state being defined by the engine operating condition and the reverse direction condition and the cutting unit engaged condition, and a forth vehicle operational state being defined by the engine operating condition and the reverse direction condition and the cutting unit disengaged condition, said control circuit comprising:

a PTO switch for selectively controlling the cutting unit between the engaged condition and the disengaged condition;

an override switch operatively coupled to the PTO switch for establishing an override condition and a non-override condition, said override switch being responsive to the PTO switch wherein the override condition is released upon activating the PTO switch to place the cutting unit in the disengaged condition so that the vehicle is then in the non-override condition;

a reverse switch operatively coupled to the PTO switch which is responsive to the vehicle operating in the reverse direction condition;

wherein when the vehicle is in the first state and the override switch is in the non-override condition and the direction condition transitions from the neutral condition to the reverse condition, a next vehicle operational state will be either the second state or the forth state; and wherein when the vehicle is in the first state and in the override condition and the direction condition transitions from the neutral condition to the reverse condition, the next vehicle operational state will be the third state so long as the cutting unit remains engaged, and regardless of the vehicle having been in a forward direction condition subsequent to establishing the override condition.

2. The control circuit for a vehicle according to claim 1 wherein the override condition is available only if the override switch is activated prior to the PTO switch placing the cutting unit in the engaged condition.

3. The control circuit for a vehicle according to claim 1 wherein the override condition is available only if the PTO switch is first activated placing the cutting unit in the engaged condition and then the override switch is activated.

4. The control circuit for a vehicle according to claim 1 wherein the cutting unit must be in the disengaged condition prior to engine operation.

5. The control circuit for a vehicle according to claim 1 wherein the override switch has a removable override key.

6. The control circuit for a vehicle according to claim 1 wherein the override switch is a momentary contact switch.

7. The control circuit for a vehicle according to claim 5 wherein with the override key removed from the override switch, the override condition is not accessible.

8. The control circuit for a vehicle according to claim 5, further comprising:

an ignition switch having a removable ignition key, and said ignition key being separate from the override key.

9. The control circuit for a vehicle according to claim 1 wherein the PTO switch is a PTO status switch, further comprising:

a kill relay operatively coupled to the engine of the vehicle for deactivating the engine, so that when the vehicle is in the first state and the override switch is in the non-override condition and the direction condition transitions from the neutral condition to the reverse condition, the next vehicle operational state will be the second state.

10. The control circuit for a vehicle according to claim 1, further comprising:

an electric PTO clutch operatively coupled to the cutting unit, so that when the vehicle is in the first state and the override switch is in the non-override condition and the direction condition transitions from the neutral condition to the reverse condition, the next vehicle operational state will be the forth state.

11. The control circuit for a vehicle according to claim 9, further comprising:

a first relay switch operatively coupled to the override switch and capable of being placed in a latched configuration when the PTO status switch is contacted to engage the cutting unit and the override switch has been activated; and a second relay switch operatively coupled to the PTO status switch and the reverse switch and the first relay switch and the kill relay and under normal operating conditions with the PTO status switch engaging the cutting unit the kill relay deactivates the engine in response to the reverse switch being activated, and while operating under the override condition with the PTO status switch activated and the first relay switch in a latched configuration, the kill relay does not deactivate the engine in response to the reverse switch so long as the PTO status switch remains engaging the cutting unit.

12. A control circuit for an engine-driven lawn mower having a cutting unit for cutting vegetation, said lawn mower having a transmission capable of propelling the lawn mower in a forward direction or a reverse direction, said control circuit for deactivating the engine, said control circuit comprising:

a kill relay operatively coupled to an engine component and a circuit ground, said kill relay capable of deactivating the engine upon establishing a connection between said engine component and the circuit ground;

a selectively activatable PTO status switch operatively coupled to the kill relay and having an on position and an off position corresponding to activating and deactivating the cutting unit of the lawn mower;

a reverse switch operatively coupled to the PTO status switch, said reverse switch being responsive to the lawn mower being placed in a reverse direction condition;

a selectively activatable override switch operatively coupled to the PTO status switch and capable of establishing an override condition of the lawn mower;

a first relay switch operatively coupled to the override switch and capable of being placed in a latched configuration when the PTO status switch is in the on position and the override switch has been activated; and a second relay switch operatively coupled to the PTO status switch and the reverse switch and the first relay switch and the kill relay, under normal operating conditions with the PTO status switch in the on position the kill relay deactivates the engine in response to an input from the reverse switch, and while operating under the override condition with the PTO status switch in the on position and the first relay switch in the latched configuration, the kill relay does not deactivate the engine in response to an input from the reverse switch so long as the PTO status switch remains in the on position, even though the lawn mower entered a forward direction condition subsequent to the override switch being activated.

13. A control circuit for an engine-driven lawn mower according to claim 12 wherein the first relay switch is removed from the latched configuration upon the PTO status switch being switched into the off position, returning the lawn mower to the non-override condition.

14. A control circuit for an engine-driven lawn mower according to claim 12 wherein the PTO status switch must be in the off position to activate the engine from an engine deactivated condition.

15. A control circuit for an engine-driven lawn mower according to claim 12 further comprising: a magneto ignition circuit for the engine, the kill relay operatively coupled to said magneto ignition circuit and the circuit ground.

16. A control circuit for an engine-driven lawn mower according to claim 12 wherein the override switch is a momentary contact switch.

17. A control circuit for an engine-driven lawn mower according to claim 12 wherein the override switch has a removable key and wherein with the removable key removed from the override switch the override condition is not accessible.

18. A control circuit for an engine-driven lawn mower according to claim 12 wherein the override condition is available only if the override switch is activated prior to the PTO status switch being placed in the on position.

19. A control circuit for an engine-driven lawn mower according to claim 12 wherein the override condition is available only if the PTO status switch is placed in the on position prior to the override switch being activated.

20. A control circuit for an engine-driven lawn mower having a cutting unit, said lawn mower having a transmission capable of propelling the mower in a forward direction or a reverse direction, said control circuit comprising:

a control module having a plurality of terminals;

an engine kill relay operatively coupled to at least one of said plurality of terminals of the control module, said engine kill relay capable of deactivating the engine in response to a control module signal;

a selectively activatable PTO status switch unit having an on position and an off position corresponding to engaging and de-engaging the cutting unit, said PTO status switch operatively coupled to at least one of said plurality of terminals of the control module;

a reverse switch operatively coupled to at least one of said plurality of terminals of the control module, said reverse switch being responsive to the lawn mower being placed in a reverse direction condition; and an override switch operatively coupled to at least one of the plurality of terminals of said control module, said override switch capable of being actuated, said control module signaling the kill relay to deactivate the engine when the cutting unit is engaged and the reverse switch is triggered, unless both the override switch has been actuated and the PTO status switch has not been returned to the off position, and regardless of the lawn mower having been propelled in a forward direction subsequent to the override switch being actuated.

21. A control circuit for an engine-driven lawn mower according to claim 20 wherein the control module signals the kill relay to deactivate the engine when the cutting unit is engaged and the reverse switch is triggered, unless the PTO status switch is placed in the on position subsequent to the override switch being actuated.

22. A control circuit for an engine-driven lawn mower according to claim 20 wherein the control module signals the kill relay to deactivate the engine when the cutting unit is engaged and the reverse switch is triggered, unless the override switch is actuated subsequent to the PTO status switch being placed in the on position.

23. A control circuit for an engine-driven lawn mower according to claim 20, said control module comprising:

a first relay switch operatively coupled to the override switch and capable of being placed in a latched configuration when the PTO status switch is in the on position and the override switch has been activated; and a second relay switch operatively coupled to the PTO status switch and the reverse switch and the first relay switch and the kill relay and under normal operating conditions with the PTO status switch in the on position the kill relay deactivates the engine in response to the reverse switch being activated.

24. A control circuit for a engine-driven lawn mower having a cutting unit for cutting vegetation, said mower having a transmission capable of propelling the mower in a forward direction or a reverse direction, said control circuit comprising:

a control module having a plurality of terminals;

a selectively activatable PTO switch having an on position and an off position corresponding to activating and deactivating an electric PTO clutch, said electric PTO clutch for controlling the cutting unit of the mower, said PTO switch operatively coupled to at least one of said plurality of terminals of the control module;

a reverse switch operatively coupled to at least one of said plurality of terminals of the control module, said reverse switch being activated upon the mower being placed in a reverse direction condition; and an override switch operatively coupled to at least one of the plurality of terminals of said control module, said override switch capable of being activated, said control module deactivating the electric PTO clutch when the reverse switch is activated, unless both the override switch has been activated and the PTO switch has not been returned to the off position, and regardless that the mower has been propelled in a forward direction subsequent to the override switch being actuated.

25. A control circuit for an engine-driven lawn mower according to claim 24 wherein the control module deactivates the electric PTO clutch when the reverse switch is activated, unless the override switch has been activated subsequent to the PTO switch being placed in the on position.

26. A control circuit for an engine-driven lawn mower according to claim 24 wherein the control module deactivates the electric PTO clutch when the reverse switch is activated, unless the PTO switch has been activated subsequent to the override switch being activated.

27. A control circuit for a vehicle having a powered implement, said vehicle having a transmission capable of propelling the vehicle in a forward direction or a reverse direction, said control circuit comprising:

a control module having a plurality of terminals;

a selectively activatable PTO switch having an on position and an off position corresponding to activating and deactivating an electric PTO clutch, said electric PTO clutch for controlling the implement of the vehicle, said PTO switch operatively coupled to at least one of said plurality of terminals of the control module;

a reverse switch operatively coupled to at least one of said plurality of terminals of the control module, said reverse switch being activated upon the vehicle being propelled in the reverse direction; and an override switch operatively coupled to at least one of the plurality of terminals of said control module, said override switch capable of being activated, said control module deactivating the electric PTO clutch when the reverse switch is activated, unless both the override switch has been activated and the PTO switch has not been returned to the off position, and regardless that the vehicle has been propelled in a forward direction subsequent to the override switch being actuated.

28. A control circuit for an engine-driven lawn mower according to claim 27 wherein the control module deactivates the electric PTO clutch when the reverse switch is triggered, unless the PTO switch is placed in the on position subsequent to the override switch being actuated.

29. A control circuit for an engine-driven lawn mower according to claim 27 wherein the control module deactivates the electric PTO clutch when the reverse switch is triggered, unless the override switch is actuated subsequent to the PTO switch being placed in the on position.

30. A method of operating a cutting unit of an engine-drive lawn mower, said cutting unit having an engaged condition and a disengaged condition, said lawn mower having a transmission capable of propelling the lawn mower in a forward direction or in a reverse direction, said method comprising the steps of:

providing a control circuit for controlling the cutting unit, said control circuit including a control module having a plurality of terminals, a selectively activatable PTO switch having an on position and an off position corresponding to engaging and disengaging, respectively, the cutting unit of the lawnmower, said PTO switch operatively coupled to at least one of said plurality of terminals of the control module, a reverse switch operatively coupled to at least one of said plurality of terminals of the control module, said reverse switch being activated upon the lawnmower being propelled in the reverse direction, and an override switch operatively coupled to at least one of the plurality of terminals of said control module, said override switch capable of being activated, said control module disengaging the cutting unit when the reverse switch is activated, unless both the override switch has been activated and the PTO switch has not been returned to the off position;

activating the PTO switch to the on position to engage the cutting unit;

activating the override switch to establish the override condition of the mower;

engaging the transmission to propel the lawn mower in the reverse direction;

engaging the transmission to propel the lawn mower in the forward direction;

disengaging the cutting unit unless both the override switch remains activated and the PTO switch remains activated, even though the lawn mower was propelled in a forward direction subsequent to the override switch being actuated;

deactivating the PTO switch to the off position to disengage the cutting unit and remove the mower from the override condition;

activating the PTO switch to the on position to engage the cutting unit; and disengaging the cutting unit upon engaging the transmission to propel the lawnmower in the reverse direction.

31. A method of activating and deactivating a cutting unit of a lawn mower according to claim 30 wherein the step of deactivating the cutting unit is by deactivating the engine.

32. A method of activating and deactivating a cutting unit of a lawn mower according to claim 30, the lawn mower further having an electric PTO clutch for engaging the cutting unit to the engine, wherein the step of deactivating the cutting unit is by operation of said electric PTO clutch.

33. A method of activating and deactivating a cutting unit of a lawn mower according to claim 30 wherein the step of actuating the override switch to the override state to establish the override condition occurs prior to the step of actuating the PTO switch to the active position.

34. A riding lawn mower comprising:

a) a prime mover;

b) a transmission for transmitting power from the prime mover to a driving wheel, the transmission having forward and rearward mower propelling modes;

c) a cutting deck with a rotating cutting blade wherein the cutting blade is defined by a first rotating condition where the blade rotates and a second nonrotating condition where the blade is stopped; and d) an interlock system comprising an override switch wherein the cutting blade will not rotate when the mower is rearwardly propelled unless an override condition is established subsequent to a first transition of the cutting blade from the first rotating condition to the second nonrotating condition, and upon the override condition being established a change of a direction of the lawn mower will not release the override condition, and wherein a second transition of the cutting blade from the first rotating condition to the second nonrotating condition releases the override condition preventing rotation of the cutting blade when the mower is rearwardly propelled until the override condition is again established.

35. A riding lawn mower comprising:

a) a prime mover for propelling the lawn mower in forward and rearward propelling modes;

b) a cutting deck with a rotating cutting blade wherein the cutting blade has a first rotating condition where the blade rotates and a second nonrotating condition where the blade is stopped; and c) an interlock system comprising an override switch wherein the cutting blade will not rotate when the mower is rearwardly propelled unless an override condition is established subsequent to a first transition of the cutting blade from the first rotating condition to the second nonrotating condition, and upon the override condition being established a change of a direction of the lawn mower will not release the override condition, and wherein a second transition of the cutting blade from the first rotating condition to the second nonrotating condition releases the override condition preventing rotation of the cutting blade when the mower is rearwardly propelled until the override condition is again established.

* * * * *